United States Patent [19]

Shikata et al.

[11] Patent Number: 5,722,036
[45] Date of Patent: Feb. 24, 1998

[54] MANUFACTURING PROCESS OF CONNECTING ROD ASSEMBLY AND COMPACTING DIE

[75] Inventors: Hideo Shikata, Chiba; Jun Sakai, Tokyo, both of Japan

[73] Assignee: Hitachi Powdered Metals Co., Ltd., Japan

[21] Appl. No.: 775,383

[22] Filed: Dec. 30, 1996

[30] Foreign Application Priority Data

Jan. 9, 1996 [JP] Japan .................................. 8-001503

[51] Int. Cl.[6] .................................. B22F 3/12; B22F 5/00
[52] U.S. Cl. .................................. 419/38; 419/47; 425/78; 29/DIG. 31; 75/228; 75/249; 74/579 R; 74/579 E
[58] Field of Search .................................. 419/38, 47; 425/78; 29/DIG. 31; 75/228, 249; 74/579 R, 579 E

[56] References Cited

U.S. PATENT DOCUMENTS

| | | | |
|---|---|---|---|
| 4,094,053 | 6/1978 | Weaver | 29/420 |
| 4,977,868 | 12/1990 | Holschuh | 123/182 |
| 5,051,232 | 9/1991 | Summers | 419/27 |
| 5,109,605 | 5/1992 | Hoag et al. | 29/888.09 |
| 5,460,776 | 10/1995 | Ackermann et al. | 419/44 |
| 5,536,089 | 7/1996 | Weber et al. | 384/294 |
| 5,544,413 | 8/1996 | Stevens et al. | 29/888.092 |
| 5,551,782 | 9/1996 | Arnhold et al. | 384/294 |
| 5,568,891 | 10/1996 | Hoag et al. | 225/93 |
| 5,594,187 | 1/1997 | Lynn | 75/246 |

Primary Examiner—Charles T. Jordan
Assistant Examiner—Daniel Jenkins
Attorney, Agent, or Firm—McDonnell Boehnen Hulbert & Berghoff

[57] ABSTRACT

Disclosed is a manufacturing process of a sintered connecting rod assembly comprising a first member with a projection and a second member with a concavity in which the first member and the second member are mated with each other by engaging the projection with the concavity. A powdered raw material is compacted into a first compact and a second compact for the first and second members, wherein the projection of the first compact has a width slightly larger than the width of the concavity of the second compact. Then the projection of the first compact is engaged with the concavity of the second compact to mate the first compact with the second compact, thereby the projection and the concavity are tightly pressed against each other. After sintering the mated first and second compacts, they are forced to release the projection from the concavity. The die for compacting the raw material has a whole cavity and a removable core for dividing the whole cavity into two cavities.

16 Claims, 2 Drawing Sheets

MANUFACTURING PROCESS OF CONNECTING ROD ASSEMBLY AND COMPACTING DIE

BACKGROUND OF THE INVENTION

1. Field of the Invention

The present invention relates to a process for manufacturing a connecting rod for engines by means of powder metallurgical techniques, and a compacting die which is used for manufacturing the same.

2. Description of the Prior Art

A connecting rod of an engine is constructed from three portions, namely, a small terminal portion with a small bearing hole, a large terminal portion with a large bearing hole, and a rod portion connecting the small terminal portion and the large terminal portion. The connecting rod is commonly formed into two separate parts, i.e., a semicircular end cap including an almost half part of the large terminal portion, and a main body including the rest of the large terminal portion, the rod portion and the small terminal portion, and the above-described structure has occurs from the necessity of fitting the large bearing hole of the connecting rod onto the crank rod of the engine.

Manufacture of the above-described connecting rod by using powder metallurgical technique can be carried out through one of the following routes.

1) Each of the main body and the end cap are separately manufactured from the powdered raw material.

2) The powdered raw material is formed into a green compact which is made up of both parts for the main body and the end cap. The green compact is then cut into two parts for the main body and for the end cap, and the separated parts are sintered, respectively, to obtain each of the main body and the end cap.

3) A green compact which is made up of both of the main body and the end cap and which also has notchs or pin holes at the positions to be cut off is formed. The green compact is then sintered, and the sintered product is cut at the notchs or the pin holes to obtain the main body and the end cap.

In regard to manufacture of the connecting rod by the above-described method, there are some known arts for making the main body and the end cap correctly meet without dislocation. For example, a step or serration is intentionally provided on the meeting faces on which the main body and the end cap are joined with each other, in order to make the meeting faces uneven. Alternatively, the portion for the meeting faces of the green compact or sintered body is broken so that the meeting faces are incidentally made uneven.

However, the conventional manufacturing method described above has the following problems.

a) In the route 1) described above, it is required for realizing accurate engagement of the end cap and the main body to subject the end cap and the main body to sizing treatment or cutting treatment.

b) In the route 2), since control of formation of the meeting faces on the green compact is difficult, the meeting faces are not made in steady conditions. As a result, accuracy of engagement remarkably falls, and some additional work for correcting the meeting faces is necessary.

c) In the route 3), a strong force is necessary to break the sintered product at the notchs or the pin holes and divide into two parts. As a result, an apparatus on a large scale that can supply sufficient power on the sintered product is required for the breaking work. Moreover, if a ductile material is used as a raw material for the connecting rod, it is plastically deformed in the vicinity of the broken portion during the breaking work. Therefore, the raw material which is applicable to the above manufacturing method is strictly limited.

SUMMARY OF THE INVENTION

With these problems in mind, therefore, it is the primary object of the present invention to provide a novel process for manufacturing a connecting rod assembly in which the assembling parts of the connecting rod assembly are easily produced with high preciseness and the obtained assembling parts are fitting mated with each other without dislocation.

It is another object of the present invention to provide a novel compacting die which is used for manufacturing the connecting rod assembly as described above.

In order to achieve the above-mentioned object, the process for manufacturing a connecting rod assembly according to the present invention provides a sintered connecting rod assembly comprising a first member with a projection and a second member with a concavity in which the first member and the second member are mated with each other by engaging the projection with the concavity, and comprises the steps of: compacting a powdered raw material into a first compact and a second compact, wherein the first compact has a shape corresponding to the first member to have a projection and the second compact has a shape corresponding to the second member to have a concavity, excepting that the projection of the first compact has a width slightly larger than the width of the concavity of the second compact so that, if the projection of the first compact is engaged with the concavity of the second compact, the projection of the first compact and the concavity of the second compact are tightly pressed against each other; engaging the projection of the first compact with the concavity of the second compact to mate the first compact with the second compact; sintering the first compact and the second compact being mated with each other to produce a first member with a projection and a second member with a concavity which are being mated with each other; and forcing the projection of the first member to release from the concavity of the second member to separate the first member from the second member.

The die for compacting a powdered raw material into a first compact with a projection and a second compact with a concavity for manufacture of a sintered connecting rod assembly comprising a first member with a projection and a second member with a concavity in which the first member and the second member are mated with each other by engaging the projection with the concavity, according to the present invention comprises: a die having a whole cavity; and a first core removably disposed in the whole cavity to divide the whole cavity into a first cavity for molding the first compact and a second cavity for molding the second compact, wherein a hollow for forming the projection of the first compact and a protrusion for forming the concavity of the second compact are provided on the first core.

The features and advantages of the manufacturing process according to the present invention over the conventional method will be more clearly understood from the following description of the preferred embodiments of the present invention taken in conjunction with the accompanying drawings in which like reference numerals designate the same or similar elements or sections throughout the figures thereof.

DETAILED DESCRIPTION OF THE PREFERRED EMBODIMENTS

Figure 1:
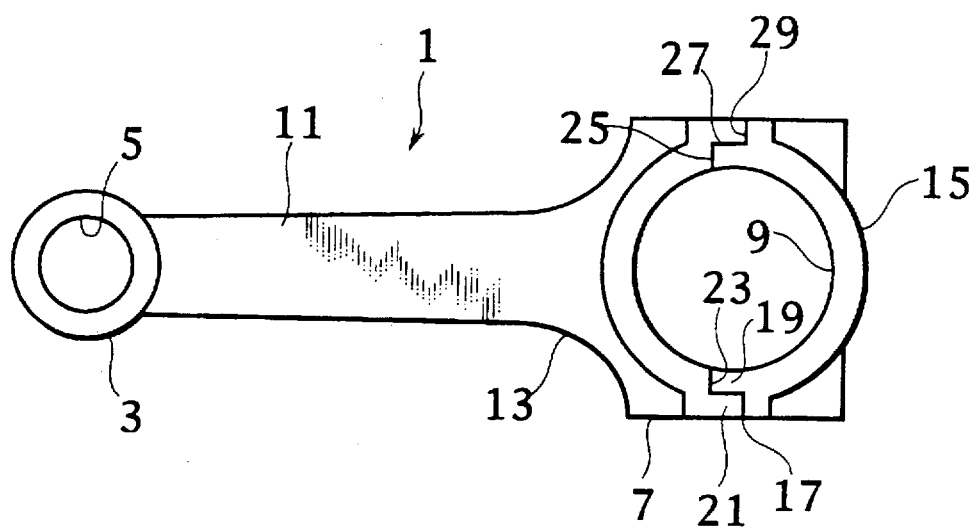
FIG. 1 is a plan view showing an example of the sintered connecting rod assembly manufactured by the manufacturing process according to the present invention.

Referring now to the drawings, preferred embodiments of the manufacturing process and the compacting die used in the manufacturing process according to the present invention will be described.

Figure 2:
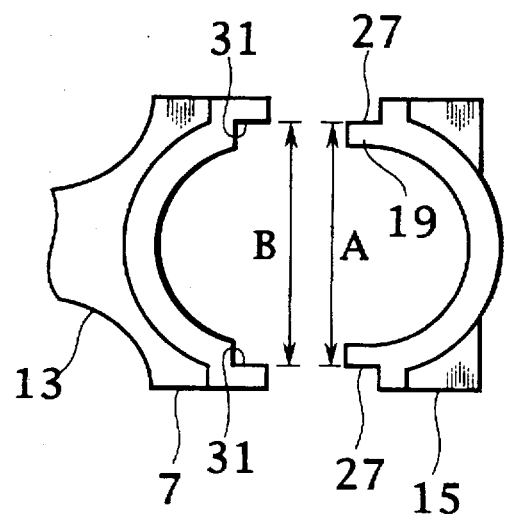
FIG. 2 is a plan view showing a large end portion of the connecting rod assembly of FIG. 1 for explanation of engagement of the first member and the second member at the large end portion.

FIG. 1 and FIG. 2 show an example of the sintered connecting rod assembly which is produced by the manufacturing process of the present invention. The sintered connecting rod assembly 1 of FIG. 1 has a small end portion 3 with a small bearing hole 5, a large end portion 7 with a large bearing hole 9 and a connecting portion 11 which connects the small end portion 3 and the large end portion 7, and it is assembled from a main body 13 and a cap 15 which are separable from each other in such a manner that the large end portion 7 and the large bearing hole 9 is divided into halves by a section 17. The section 17 dividing the large end portion 7 is perpendicularly bent like a hook in such a manner that a pair of inner projections 19 is provided on the cap 15 adjacent to the large bearing hole 9 and a pair of outer projections 21 are provided on the main body 13, respectively. A concavity 28 is formed on the main body 13 by the outer projections 21, crossing the large bearing hole 9. The inner projections 19 are received in the concavity 23, thereby the inner projections 19 and the outer projections 21 are fittingly meshed with each other. The inner projections 19 and the outer projections 21 extend in a longitudinal direction of the sintered connecting rod assembly 1. Each of the inner projections 19 has a tip face 25 which is perpendicular to the longitudinal direction of the sintered connecting rod assembly 1 and a side face 27 which is parallel to the longitudinal direction and the axis of the large bearing hole 9. Each of the outer projections 21 has a tip face 29 which is perpendicular to the longitudinal direction of the sintered connecting rod assembly 1 and a side face 31 which is parallel to the longitudinal direction.

As understood from the above, the width A of the inner projections 19 (i.e. distance between the side faces 27) of the sintered connecting rod assembly is substantially equal to the width B of the concavity 23 (i.e. distance between the side faces 31).

The sintered connecting rod assembly described above is manufactured according to the present invention, as follows. Firstly, a powdered raw material which has a predetermined composition for the connecting rod assembly is compressed to form first and second green compacts each having a shape corresponding to each of the main body 13 and the cap 15. Here, it should be noted that the width A of a set of the inner projections 19 of the first green compact for the cap 15 is slightly larger than the width B of the concavity 23 of the second green compact for the main body 13. In accordance with the above construction, if the inner projections 19 of the first green compact for the cap 15 is engaged with the concavity 23 of the second green compact for the main body 13, the inner projections 19 and the concavity 23 are tightly pressed against each other.

Secondly, the inner projections 19 of the first green compact described above are inserted into the concavity 23 of the second green compact, moving the first green compact to the second green compact in the longitudinal direction of the green compacts. Then the first green compact and the second green compact are mated with each other, while the inner projections 19 of the first green compact are engaged with the concavity 23 of the second green compact. At this time, the inner projections 19 and the concavity 23 are tightly pressed against each other in the lateral direction, and this prevents the engagement from being released.

Thirdly, the mated first and second green compacts are sintered at a predetermined sintering temperature to produce a sintered first and second bodies being mated with each other, namely, the cap 15 and the main body 13 being mated with each other and slightly bonded to each other are obtained.

Fourthly, the inner projections 19 of the cap 15 are forced to release from the concavity 23 of the main body 13 by pulling the inner projections 19 out of the concavity 23. As a result, the cap 15 is separated from the main body 13. If the cap 15 is mated again with the main body 13, the inner projections 19 of the cap 15 are smoothly inserted into the concavity 23 of the main body and fitted therein.

As understood from FIG. 2, the feature of the present invention resides in the structure of the first and second green compacts formed so that, when the green compacts are mated with each other, the inner projections 19 of the first green compact and the concavity 23 of the second green compact press against each other to tightly contact at the side faces 27 and the side faces 31 with each other. The pressing force being produced between the side faces 27 and 31 is released during the sintering treatment, and the sintered first and second bodies obtained from the first and second green compacts tightly contact or they are slightly bonded but they are not united. Therefore, if the sintered first and second bodies are pulled apart, they are relatively easily separated to obtain the cap 15 and the main body 13 which can be fittingly mated to assemble the sintered connecting rod assembly 1.

The section 17 of the sintered connecting rod assembly 1 includes the side faces 27, 31 and the tip faces 25, 29 which are parallel to the axis of the large bearing hole 9. The side faces 27, 31 are also parallel to the direction in which the cap 15 is moved to the main body 13 to insert the inner projections 19 into the concavity 23, and they achieve tight engagement of the inner projections 19 and the concavity 23. The tip faces 25, 29 are perpendicular to the side faces 27, 31 to abut on the opposing member.

The sintered connecting rod assembly is preferably composed of aluminum alloy, iron alloy, copper alloy or the like. A mixed powder of simple powders or alloy powders, having substantially the same composition as that of the connecting rod assembly as a whole, is prepared as the powdered raw material for manufacturing the green compacts. Of course, the mixed powder may contain a common lubricant or other additives which are used in powder metallurgy as occasion arises. As a specific example of the composition of the powdered raw material, an aluminum alloy composed of 2.4 to 23.5% silicon, 2 to 5% copper, 0.2 to 1.5% magnesium, 0.01 to 1% transition metal and balance aluminum, and the like can be illustrated. The transition metal can be selected from titanium, vanadium, chromium, manganese, iron, cobalt, nickel, zirconium and niobium.

Preferably, the powdered raw material has a maximum particle size of about 150 μm or less, and it is compressed to form the first and second green compacts for the cap 15 and the main body 13 at a green density of about 2.1 to 2.5 g/cm$^3$ which corresponds to a density ratio of approximately 80 to 90%.

In general, the connecting rod assembly of an engine for automobiles has a length of about 100 to 200 mm, a diameter of the large bearing hole of about 30 to 100 mm, and a diameter of the small bearing hole of about 10 to 45 mm. During the sintering, the dimension of the green compact slightly changes due to shrinkage or growth, and this dimensional change commonly varies with the particle size of the powdered raw material within a range of about −4.0 to +5.0%. Therefore, the dimension of the die cavity which is used for forming the first and second green compacts is appropriately determined in the light of the above.

The difference between the width A of the projections 19 and the width B of the concavity 23 in the green compacts is determined in view of strength or durability of the first and second green compacts and elastic deformation so that the engaged inner projections 19 and outer projections 21 are not broken by the force pushing against each other. Specifically, the difference between the width A of the projections 19 and the width B of the concavity 23 is preferably determined so that the ratio of the difference relative to the width B of the concavity 23 is about 0.1% or less. For the connecting rod assembly having a general dimension as described above, the above-described difference between the width A and the width B in the green compacts can be suitably set to about 0.04 mm or less. In accordance with the above construction, since the mated green compacts are tightly pressed to each other at the projections 19 and the concavity 23, they are prevented from being released or dislocated during the transporting operation, the sintering treatment and the like.

The first and second green compacts are mated with each other and sintered. If the mated green compacts are heated at a temperature that liquid phase sintering develops, the sintered bodies are jointed at the meeting surfaces or the section 17. This joint has an appropriate strength for maintaining the engagement during processing of the large bearing hole. However, it is relatively easily released by pulling the sintered bodies apart. Specifically, it is released by applying a load to the sintered and jointed bodies in such a direction as to slant the sintered body of the cap 15 relative to another body of the main body 13. Or, a tapered rod may be pushed in the large bearing hole 9 of the sintered and jointed bodies. Alternatively, the large bearing hole of the sintered and united bodies is extended by means of a collet chuck or the like. The joint made on the section 17 is broken by one of the above manners so that meeting surfaces like ground faces are made on the separated the cap 15 and the main body 13 due to shear and slip. These meeting surface certainly realize dimensional accuracy for the engagement, and the sintered connecting rod assembly obtained by the manufacturing process according to the present invention is accurately assembled.

If the mated green compacts are sintered at a temperature that liquid phase sintering does not develop, the sintered bodies are hardly jointed at the meeting surfaces or the section 17. The section 17 between the sintered first and second bodies has less strength, and they are easily separated by pulling them apart to obtain the cap 15 and the main body 13. The inner projections 19 of the cap 15 once separated are easily and smoothly inserted into the concavity 23 of the main body 13 so that the cap 15 and the main body 13 are fittingly mated again.

As understood from the above, the present invention accomplishes dimensional accuracy of the engaging portions and fitting engagement at the section 17 or the meeting surfaces of the cap 15 and the main body 13.

In the above example of the sintered connecting rod assembly 1, the cap 15 has the inner projections 19, and the main body 13 has the outer projections 21 and the concavity 23. However, it is of course possible to provide the inner projections on the main body and to provide the outer projections and the concavity on the cap, reversely. The tip faces 25, 29 may not be perpendicular to the longitudinal direction of the connecting rod assembly. Moreover, the projections 19, 21 and the edge of the concavity 23 may be beveled or relieved. This makes it easy to insert the projections into the concavity. However, it must be of course avoided to provide such a beveling or reliev that the large bearing hole 9 is not completely formed on the cap 15 and the main body 18 mated with each other. Moreover, the large end portion 7 may be divided by a section which crosses the longitudinal direction of the connecting rod assembly at non-right angles.

For the sintered connecting rod assembly produced by the manufacturing process of the present invention, there is no need to pay attention to accuracy and variation in the processing work. Moreover, in comparison with formation of the meeting surfaces by the sizing work, influence by difference in accuracy of the die is relatively small in the present invention. Therefore, there is no need for making of the compacting die to pay attention to accuracy of the cavity surface for forming the meeting surfaces. Even in a case where the sintered bodies must be further subjected to the cold sizing treatment, if the sintered bodies being mated with each other are sized before they are separated, formation of the meeting surfaces is not affected by difference in accuracy of the die.

Figure 3:
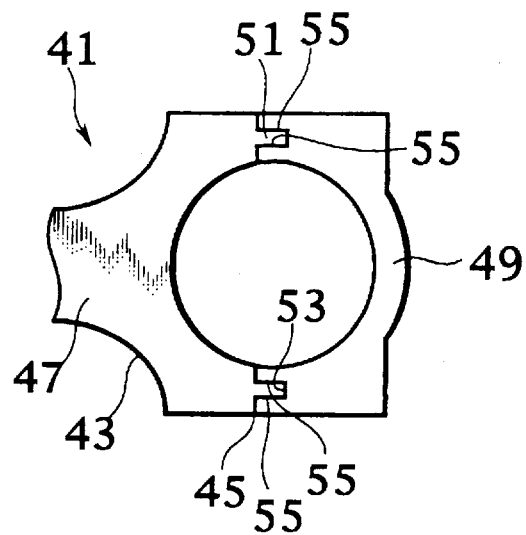
FIG. 3 is a plan view showing a large end portion of another example of the sintered connecting rod assembly manufactured by the manufacturing process according to the present invention.

FIG. 3 shows another example of the large end portion of the sintered connecting rod assembly which is produced by the manufacturing process of the present invention. Since other portions of the sintered connecting rod assembly are the same as those of the former example shown in FIG. 1, they are not shown in FIG. 3. This sintered connecting rod assembly 41 is divided by a section 45 at the large end portion 43 into the main body 47 and the cap 49. The section 45 of this example is formed in such a manner that the main body 47 has two projections 51 and that the cap 49 has two concavities 53 each of which receives each of the projections 51, respectively. Namely, this embodiment has two couples of the projection 51 and the concavity 53 at the opposing sides of the large bearing hole, and this is different from the former embodiment which has a couple of two projections 19 and a concavity 23.

In the example of FIG. 3, when the first and second green compacts for the cap 49 and the main body 47 are made, the width of each of the projections 51 of the first green compact is set to be slightly larger than that of each of the concavities 53 of the second green compact. In accordance with this structure, if the projections 51 are inserted into the concavities 53 to mate the first and second green compacts, each of the projections 51 is tightly pressed against each of the concavities 53 at a pair of side faces 55. In the case like this example, the difference between the width of the projection 51 and that of the concavity 53 is preferably determined so that the ratio of the difference relative to the width of the concavity 53 is about 1.0% or less, and the width of the concavities 53 of FIG. 3 is within a range of 3 to 10 mm and that of the projections 51 is larger by at most 0.04 mm.

Figure 4:
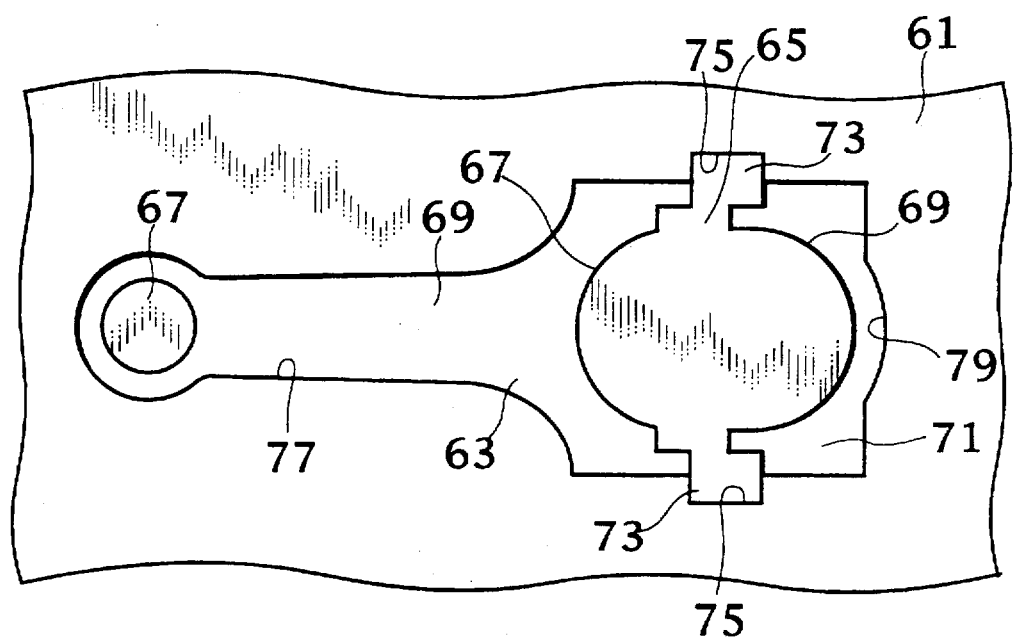
FIG. 4 is a plan view showing a compacting die which is used for manufacturing the sintered connecting rod assembly of FIG. 1 according to the present invention.

FIG. 4 shows an example of the compacting die which is used for forming the first and second green compacts of the cap 15 and the main body 13 of FIG. 1. The compacting die 61 has a whole cavity 63, and a large core 65 and a small core 67 are provided in the whole cavity 63. The large core 65 has a first surface 67 and a second surface 69. The first surface 67 has a shape corresponding to a half of the large bearing hole 9, the outer projections 21 and the concavity 23 of the first green compact, and the second surface 69 corresponds to another half of the large bearing hole 9 and the inner projections 19 of the second green compact. The large core 65 has a pair of flange portions 73 which are received in a pair of recesses 75 provided on the whole cavity 63. The side surface of the whole cavity 63 is divided into a first side surface 77 and a second side surface 79 by the large core 65 and the recesses 75. The first side surface 77 is formed so as to correspond to the outline of the first green compact, and the second side face 79 corresponds to that of the second green compact. The small core 67 works to make the small bearing hole 5 on the small end portion 3 of the first green compact. The small core 67 may be formed integrally with the die 61, or it may be a separable member which is removably fitted in the whole cavity 69.

In accordance with the above structure, the whole cavity 63 is divided by the large core 65 into a first cavity 69 for making the first green compact and a second cavity 71 for the second green compact, and the first cavity 69 and the second cavity 71 are located at a short distance so that the longitudinal direction of the first and second cavities 69, 71 are aligned. The first surface 67 and the second surface 69 of the large core 65 are formed so that the width A of the projections 19 of the formed second green compact is slightly larger than the width B of the concavity 23 of the formed first green compact, and, preferably, the difference between the width A and the width B is set to about 0.04 mm or less.

Using the above compacting die 61, the powdered raw material is compacted into the first and second green compacts by filling it in the first cavity 69 and the second cavity 71 and compressing it by a punch.

In the compacting die 61 described above, the recesses 75 work to position and fix the large core 65 in the whole cavity 63. However, it is also possible to change the whole cavity 63 and the large core 65 so as to omit the recesses 75 from the whole cavity 63 and make the large core 65 to be fixed by thrusting it into the whole cavity 63. Alternatively, the large core 65 may be fixed by using a projection and a hole which are appropriately provided on the bottom surface of the whole cavity 63 and the corresponding bottom face of the large core 65, respectively, and engaging the projection with the hole.

The compacting die 61 of FIG. 4 is advantageous in that change or modification of the large end portion 7 is quite easy. Specifically, the shapes of the large bearing hole 9 and the projections and concavities for engagement can be easily varied by changing the large core 65 as occasion arises. For example, if the large core 65 is exchanged with another one which has a shape corresponding to the section 45 of the sintered connecting rod assembly 41 of FIG. 3, the green compacts of the sintered connecting rod assembly 41 can be manufactured with the changed compacting die 61. Moreover, it is also possible to change or modify only the outline of the sintered connecting rod assembly by changing the compacting die 61 but using the same large core 65.

Manufacture of the above compacting die 61 in which two cavities are formed by a single cavity and a core dividing the single cavity is easier than that of a die having two separate cavities. Moreover, the compacting die of the present invention has improved durability so that damage thereof is reduced, and the cost for manufacturing and repairing the die falls.

Of course, it is possible to integrally form the large core 65 and the compacting die 61, and it is also possible to construct the large core 65 assembled from a few parts.

EXAMPLES

The compacting die of FIG. 4 which was composed of cemeted carbide was prepared. Then a mixed powder having a composition of 12% silicon, 3% copper, 0.5% magnesium, 0.13% nickel and the balance aluminum and having a maximum particle size of 25 μm was filled in the first cavity 69 and the second cavity 71 of the compacting die 61. The mixed powder was compressed by a punch to form first and second green compacts as follows.

Compact density: 2.26 g/cm$^3$

Thickness of the green compacts: 20 mm

Diameter of the large bearing hole 9: 30 mm

Width of the large end portion 7: 45 mm

Diameter of the small bearing hole 5: 14 mm

Width of the small end portion 3: 22 mm

Width A of the projections 19: 37.03 mm

Width B of the concavity 23: 37.00 mm

The first and second green compacts were mated by thrusting the inner projections 19 into the concavity 23 to obtain the mated first and second green compacts having a whole length of 130 mm. The mated first and second green compacts were then sintered at a temperature of 540° C. for 60 minutes and cooled to a room temperature, thereby a cap 15 and a main body 13 being mated with each other were obtained.

The cap 15 and the main body 13 were separated by pulling then apart by means of a collet chuck. The obtained cap 15 and the main body 13 had the projections 19 which could be smoothly inserted into the concavity 23 to fittingly mesh the projections 19 and the projections 21.

As described above, according to the present invention, a sintered connecting rod assembly is easily manufactured and separation of the sintered product into the assembling parts can be easily carried out. Moreover, the engaging portions of the assembling parts are hardly deformed during the separation of the assembling parts, even when a relatively soft material like aluminum or the like is used for the manufacture of the connecting rod assembly. Therefore, engagement between the assembling parts is accomplished with high accuracy. As a result, a connecting rod assembly with well engagement is steadily manufactured by the manufacturing process of the present invention.

Moreover, the assembling parts, i.e., the cap and the main body are manufactured at the same time by using the compacting die of the present invention. The compacting die of the present Invention can be manufactured at a low cost and easily repaired. Therefore, it is economically suitable.

It must be understood that the invention is in no way limited to the above embodiments and that many changes may be brought about therein without departing from the scope of the invention as defined by the appended claims.

What is claimed is:

1. A process of manufacturing a sintered connecting rod assembly comprising a first member with a projection and a second member with a concavity in which the first member and the second member are mated with each other by engaging the projection with the concavity, comprising the steps of:

compacting a powdered raw material into a first compact and a second compact, wherein the first compact has a shape corresponding to the first member to have a projection and the second compact has a shape corresponding to the second member to have a concavity, excepting that the projection of the first compact has a width slightly larger than the width of the concavity of the second compact so that, if the projection of the first compact is engaged with the concavity of the second compact, the projection of the first compact and the concavity of the second compact are tightly pressed against each other;

engaging the projection of the first compact with the concavity of the second compact to mate the first compact with the second compact;

sintering the first compact and the second compact being mated with each other to produce a first member with a projection and a second member with a concavity which are being mated with each other; and forcing the projection of the first member to release from the concavity of the second member to separate the first member from the second member.

2. The manufacturing process of claim 1, wherein the projection of the first compact has a pair of first engaging surfaces, the concavity of the second compact has a pair of second engaging surfaces, the projection and the concavity are pressed to each other at the first and second engaging surfaces, and the first and second engaging surfaces are parallel to a longitudinal direction of the mated first and second compacts.

3. The manufacturing process of claim 1, wherein the sintered connecting rod assembly has a first bearing hole and is separated into the first member and second member at a section which crosses the first bearing hole, and the projection and the concavity of the first and second members are provided across the first bearing hole.

4. The manufacturing process of claim 3, wherein the concavity of the second compact has a width of 10 to 90 mm, and the width of the projection of the first compact is larger by at most 0.04 mm than the width of the concavity of the second compact.

5. The manufacturing process of claim 1, wherein the first compact and the second compact at the sintering step are sintered at a temperature such that liquid phase sintering develops.

6. The manufacturing process of claim 1, wherein the first compact and the second compact at the sintering step are sintered at a temperature such that liquid phase sintering does not substantially develop.

7. The manufacturing process of claim 1, wherein the powdered raw material contains 2.4 to 23.5% silicon, 2 to 5% copper, 0.2 to 1.5% magnesium, 0.01 to 1% transition metal and balance aluminum.

8. The manufacturing process of claim 7, wherein the transition metal is selected from the group consisting of titanium, vanadium, chromium, manganese, iron, cobalt, nickel, zirconium and niobium.

9. A sintered connecting rod assembly produced by the manufacturing process of claim 1.

10. A die for compacting a powdered raw material into a first compact with a projection and a second compact with a concavity for manufacture of a sintered connecting rod assembly comprising a first member with a projection and a second member with a concavity in which the first member and the second member are mated with each other by engaging the projection with the concavity, comprising:

a die having a whole cavity; and a first core removably disposed in the whole cavity to divide the whole cavity into a first cavity for molding the first compact and a second cavity for molding the second compact, wherein a hollow for forming the projection of the first compact and a protrusion for forming the concavity of the second compact are provided on the first core.

11. The die of claim 10, wherein the first core has a mold portion for molding a first bearing hole on the first compact and the second compact in such a manner that a half of the first bearing hole is formed on the first compact and another half of the first bearing hole is formed on the second compact.

12. The die of claim 11, further comprising a second core which is disposed in the whole cavity to form a second bearing hole on either of the first and second compacts.

13. The die of claim 10, wherein the whole cavity has a positioning recess for engaging with the first core to fix the first core in the whole cavity.

14. The die of claim 10, wherein the width of the hollow of the first core is slightly larger than the width of the protrusion of the first core so that, when the projection of the first compact formed by the first cavity is inserted into the concavity of the second compact formed by the second cavity, the projection and the concavity are pressed against each other.

15. The die of claim 14, wherein the width of the protrusion of the first core is within a range of 3 to 10 mm, and the width of the hollow of the first core is larger by at most 0.04 mm than the width of the protrusion of the first core.

16. The die of claim 10, wherein the whole cavity is formed in such a manner that longitudinal directions of the first cavity and the second cavity are aligned.

* * * * *